(12) United States Patent
Philonenko

(10) Patent No.: US 6,801,520 B2
(45) Date of Patent: Oct. 5, 2004

(54) QUEUE PRIORITIZATION BASED ON COMPETITIVE USER INPUT

(75) Inventor: Laurent Philonenko, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 10/116,427

(22) Filed: Apr. 3, 2002

(65) Prior Publication Data

US 2002/0131399 A1 Sep. 19, 2002

Related U.S. Application Data

(63) Continuation-in-part of application No. 09/366,434, filed on Aug. 2, 1999, which is a continuation-in-part of application No. 09/024,825, filed on Feb. 17, 1998, now Pat. No. 6,044,146.

(51) Int. Cl.[7] ............................................. H04L 12/28
(52) U.S. Cl. ................... 370/351; 370/412; 379/266.02
(58) Field of Search ................................. 370/351, 352, 370/412, 444, 411, 229, 251; 379/265, 266, 309, 266.02

(56) References Cited

U.S. PATENT DOCUMENTS

| | | | | |
|---|---|---|---|---|
| 5,278,898 A | * | 1/1994 | Cambray et al. | 379/266.1 |
| 5,291,550 A | * | 3/1994 | Levy et al. | 379/242 |
| 5,444,774 A | * | 8/1995 | Friedes | 379/266.01 |
| 5,870,464 A | * | 2/1999 | Brewster et al. | 379/219 |
| 5,991,392 A | * | 11/1999 | Miloslavsky | 379/265 |
| 6,044,146 A | | 3/2000 | Gisby et al. | |
| 6,263,066 B1 | * | 7/2001 | Shtivelman et al. | 379/266.06 |
| 6,430,174 B1 | * | 8/2002 | Jennings et al. | 370/352 |
| 6,449,270 B1 | * | 9/2002 | Miloslavsky | 370/356 |
| 6,456,619 B1 | * | 9/2002 | Sassin et al. | 370/356 |
| 6,459,697 B1 | * | 10/2002 | Neyman | 370/352 |
| 6,493,447 B1 | * | 12/2002 | Goss et al. | 379/265.09 |
| 2001/0040887 A1 | * | 11/2001 | Shtivelman et al. | 370/352 |

OTHER PUBLICATIONS

U.S. patent application Ser. No. 09/366,434, Torba et al., Priority Claim.

* cited by examiner

Primary Examiner—Ajit Patel
Assistant Examiner—Chirag Shah
(74) Attorney, Agent, or Firm—Donald R. Boys; Central Coast Patent Agency, Inc.

(57) ABSTRACT

A routing system is disclosed for routing communication events. The system comprises at least one data queue for queuing incoming events; at least one interaction mechanism for enabling bi-directional communication with authors of events in queue; and a processor for processing events in queue according to routing rules. In a preferred embodiment authors of the communication events are solicited through the at least one interaction mechanism to make a value contribution in exchange for advancement in the data queue.

31 Claims, 9 Drawing Sheets

Agent Status (Real-Time Request and Priority Assignment)

Agent Status (Real-Time Request and Priority Assignment)

QUEUE PRIORITIZATION BASED ON COMPETITIVE USER INPUT

CROSS-REFERENCE TO RELATED DOCUMENTS

The present patent application is a continuation-in-part (CIP) to a U.S. patent application Ser. No. 09/366,434, filed on Aug. 2, 1999 titled "Method and Apparatus for Call Distribution and Override With Priority Recognition and Fairness Timing Routines", which is a CIP to a U.S. patent entitled "Method and Apparatus for Call Distribution and Override with Priority" Ser. No. 09/024,825 filed on Feb. 17, 1998 now U.S. Pat. No. 6,044,146, disclosure of which is included herein by reference.

FIELD OF THE INVENTION

The present invention is in the field of telephony including multimedia communications. The present invention has particular application to methods for call priority assignment, distribution, and override for call distributing and routing functions associated with incoming calls from multiple service control points (SCP's) to a communication center. The methods pertain more particularly to assigning priority states to calls based on user input of value contribution.

BACKGROUND OF THE INVENTION

The present invention relates to call-centers in the art of telephony systems. Call centers, more recently referred to as communication centers because of media advances serve a client base in some form of service capacity and are well known in the art. In a typical communication center agents are employed at agent stations having at least one telephone, and in most cases other communication and processing equipment, such as a personal computer with a video display unit (PC/VDU).

Modern communication centers are computer-telephone integrated (CTI). In a CTI system a processor is connected to the switching equipment by a CTI link, and the processor runs CTI applications controlling the switch. PC/VDUs at agent stations may be interconnected on a local area network (LAN) also connected to the CTI processor.

Development of CTI communication centers has made it possible for agents to interact with callers (clients) in more ways than just by telephone. In a suitably equipped communication center, agents can operate with E-mail, Video mail, Video calls, and Internet Protocol Network Telephony (IPNT) calls as well as plain old telephony service (POTS) calls, which are more recently classified as connection-orientated-switched-telephony (COST). A communication center may be linked to other communication centers, databases, and the like in a variety of ways, such as by local area networks (LAN), wide area networks (WAN), including the World Wide Web (WWW).

Call routing to and within call centers involves processors and software dedicated to the task. To distribute incoming calls to agents in a communication center, the distribution system has to have some criteria for distribution. Most commonly there is capability for the distribution system to track which ones of phones are on-hook or off-hook, so the system may monitor which agents are busy on calls or not busy. In a simple schema then, calls are distributed on a first-in-first-out (FIFO) queue basis to available agents.

It has occurred to the inventors that a desirable goal relating to call center communication is to have agents busy on high priority calls rather than spending a lot of time covering calls of a lesser importance. For example, a high priority call may be a sales order call wherein the caller is purchasing a product or service over the telephone. A lesser priority call may be a caller who is just curious about the product or service and has a few questions to ask the agent. In a typical first in first out (FIFO) queue situation, the fist call in is the first call out regardless of importance of the call, and there is typically no facility for prioritizing calls. It would be desirable as well to be able to transfer a higher priority call to be taken by an agent who is currently engaged with a lower priority call, without having to lose the original call.

If priority states are to be observed in a communication center where incoming calls are sourced from different routing systems, then it is desirable to blend the two objectives thus taking into account the problem of assigning priority levels for all incoming calls, and the problem of certain calls receiving preferential treatment because they are sourced from a lower latency routing system.

A method is known to the inventor for promoting fairness in a communication center in response to requests for destination numbers (DNs) from network-level routers. The method includes steps for determining latency for requests from individual network-level routers, receiving a request from a first router for which latency is determined, assigning a fairness wait time to the request, the time determined as an inverse function of latency, and answering the request according to rules in effect only after the wait time has expired. In some cases requests arrive with priority, and priority is used in conjunction with latency in determining wait time. In other cases a second fairness time is imposed, after which a fairness algorithm is called to award a DN according to statistical history and call priority. The system is useful for communication centers for connection-oriented telephone systems, Internet protocol systems, and for all sorts of digital messaging and mail systems.

It has occurred to the inventor that fairness routing and priority routing schemes mentioned above can be further enhanced if a competitiveness factor among center clients (users) were allowed to help determine call or message priority. In the current system there is no provision for enabling a client to change his or her priority assignment in queue other than the algorithms and other factors taken into account at the time of routing of his or her call event.

What is clearly needed is a system and method for enabling a client of a communication center to enhance his or her own priority designation in a priority queue by offering, in real time, something of value to the center. A system and method such as this would further enhance profitability of the enterprise hosting the center.

BRIEF DESCRIPTION OF THE DRAWING FIGURES

SUMMARY OF THE INVENTION

Figure 1:
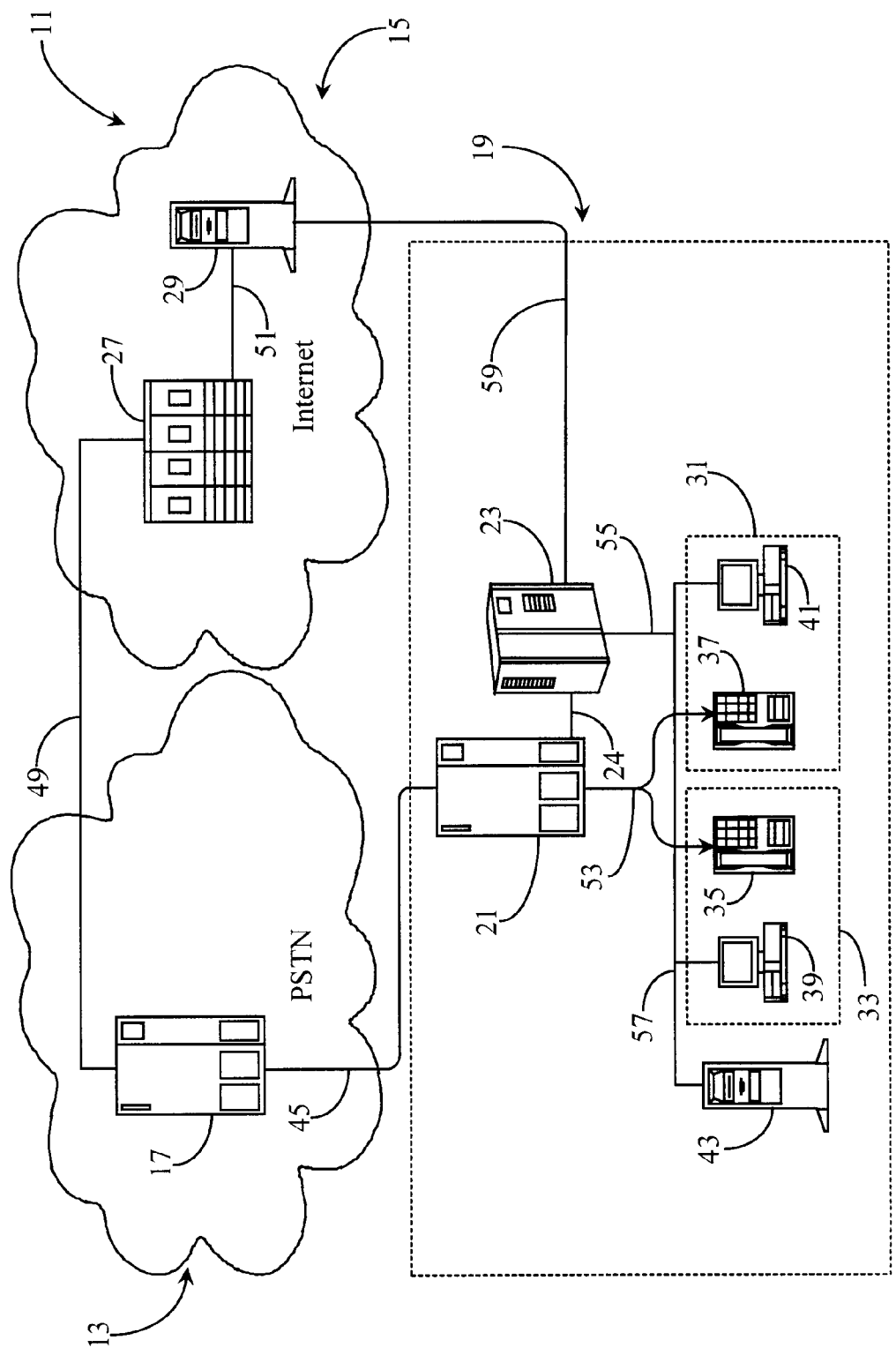
FIG. 1 is an overview of a call center environment wherein call distribution is based on call priority level according to an embodiment of the present invention.

In a preferred embodiment of the present invention a routing system for routing communication events comprising at least one data queue for queuing incoming events, at least one interaction mechanism for enabling bi-directional communication with authors of events in queue, and a processor for processing events in queue according to routing rules;

Characterized in that authors of the communication events are solicited through the at least one interaction mechanism to make a value contribution in exchange for advancement in the data queue.

In some preferred embodiments the communication events are telephony events and the interaction mechanism is an IVR. In some other preferred embodiments the communication events are instant messages and interaction mechanism is a Web form. In still others the communication events are e-mails and interaction mechanism is a Web form. In yet other embodiments the communication events are data network telephony events and interaction mechanism is a digital IVR.

In some cases the data queue has at least two levels of priority. Further the processor may be a CTI processor. The value contribution may take various forms, but in some preferred cases the value contribution is financial. Another form of contribution is attention for a period of time. The value contribution may be transacted prior to routing, or in some cases after routing.

In another aspect of the invention a method for processing communication events in a queue according to priority assigned per event in exchange for a value contribution per event is provided, comprising steps of (a) interacting with the author of each event to establish a value contribution promise or not; (b) upon receiving a promise of a value contribution, transacting the value contribution on behalf of the author; and (c) advancing the queue position of the message of the author according to the rules of transaction.

In some preferred embodiments of the method the communication events are telephony events and in step (a) interaction is through an IVR. In some other preferred embodiments the communication events are instant messages and in step (a) interaction is through a Web form. IN still others the communication events are e-ails and in step (a) interaction is through Web form. IN yet other preferred embodiments the communication events are data network telephony events and in step (a) interaction is through digital IVR.

In some cases the data queue has at least two levels of priority. Also, processing of queued events may be performed by a CTI processor. In some cases, in steps (a) and (b), the value contribution is financial, while in other cases the contribution may take other forms, such as attention for a period of time. The value contribution may also be submission of information.

In yet another embodiment of the invention a method for processing communication events in a queue according to priority assigned per event in exchange for a value contribution per event is provided, comprising steps of (a) interacting with the author of each event to establish a value contribution promise or not; (b) upon receiving promise of a value contribution, advancing the queue position according to transaction rules associated with the value contribution; and (c) after routing to final destination according to enhanced priority transacting the value contribution to the satisfaction of both parties.

In some preferred embodiments of this method the communication events are telephony events and in step (a) interaction is through an IVR. In some other preferred embodiments the communication events are instant messages and in step (a) interaction is through a Web form. I yet other preferred embodiments the communication events are e-mails and in step (a) interaction is through Web form. In still other preferred embodiments the communication events are data network telephony events and in step (a) interaction is through digital IVR. Further, the data queue may have at least two levels of priority.

In some preferred embodiments of the method processing of queued events is performed by a CTI processor. The value contribution may take a number of forms, such financial, attention for a period of time, or submission of information.

In embodiments of the invention described below in enabling detail, for the first time a routing system is provided wherein a communicant initiating a communication event to be routed may improve his or her routing status by making a contribution in some fashion to the host of the routing system, or to some other entity known to the host.

DESCRIPTION OF THE PREFERRED EMBODIMENTS

FIG. 1 is an overview of a call center environment wherein call distribution is based on call priority levels according to an embodiment of the present invention. A telephony communications network 11 comprises a call center 19 connected to a publicly-switched telephony network (PSTN) 13 and connected also to the Internet 15. Telephony communication systems with Internet connectivity such as telephony communication system 11 are known to the inventors, and are capable of multi-media and Internet-Protocol communication.

A telephony switch 17 in the PSTN is illustrated to represent any call handling equipment in the network, which may be extensive including computer integration. COST calls from the network are delivered over at least one broad-band telephony trunk 45 or an equivalent of one or more regular trunks to a telephony switch 21 within call center 19. It will be apparent to the skilled artisan that the PSTN may also be a private network rather than a public network and Internet 15 may be of the form of another wide area network (WAN) such as are known in the art. The embodiment illustrated herein represents just one example of a telephony communications environment that can utilize the method and apparatus of the present invention. Further, the method and apparatus of the present invention can be implemented in a telephony communications system that is not linked to a WAN, or, in a WAN communications system that is not liked to a telephony network. However, in a preferred embodiment, the present invention is utilized with voice calls arriving at a call center such as call center 19 within the scope of CTI telephony architecture.

Referring again to FIG. 1, COST calls from PSTN 13 are, in this embodiment, routed to telephony switch 21. A CTI processor 23 is linked to switch 21 via a CTI link 24. CTI processor 23 provides computer enhancement to call center 19. Routing protocol and similar control routines such as statistical and skill based routines may be stored and executed via processor 23. Processor 23 is, in this embodiment, connected to a LAN 57. LAN 57 also interconnects PC/VDUs at individual agent stations within call center 19 such as an agent station 31 and an agent station 33. Agent station 31 comprises an agent's telephone 37 and an agent's PC 41. Agent station 33 comprises an agent's phone 35 and an agent's PC 39. A client information system (CIS) data server 43 is also connected to LAN 57. CIS data server 43 is used to store information regarding clients, such as transaction history, preferences, order information, and the like.

It will be apparent to those with skill in the art that there may be other servers connected to LAN 57 for various purposes, such as routing and the like.

Processor 23 is linked to an Internet File-Server 29 via a digital connection 59. Switch 17 in PSTN 13 is shown connected to connected to Internet Service Provider (ISP) 27 via connection 49. The Internet connectivity is meant to show only that client's with access to PSTN 13 may have multiple ways to communicate with agents at call center 19, such as Internet-based multimedia communication as well as COST communication. WAN access such as access to Internet 15 may be of the form of a dial-up connection or a connection that remains open so that agent's PC's are continually connected to Internet 15 while an agent at the agent station is logged in.

It is an object of the present invention to assign priority to incoming calls and to route calls to agents at the call center based on the assigned priority, together with information about agent skill and status. The invention may be practiced, as will be seen, relative to COST calls, video calls, e-mail, and to any other type of communication directed to a plurality of persons such as agents at a call center. The features of the invention will be made clear by considering an embodiment directed to routing COST calls to agents at stations in a call center.

Figure 2:
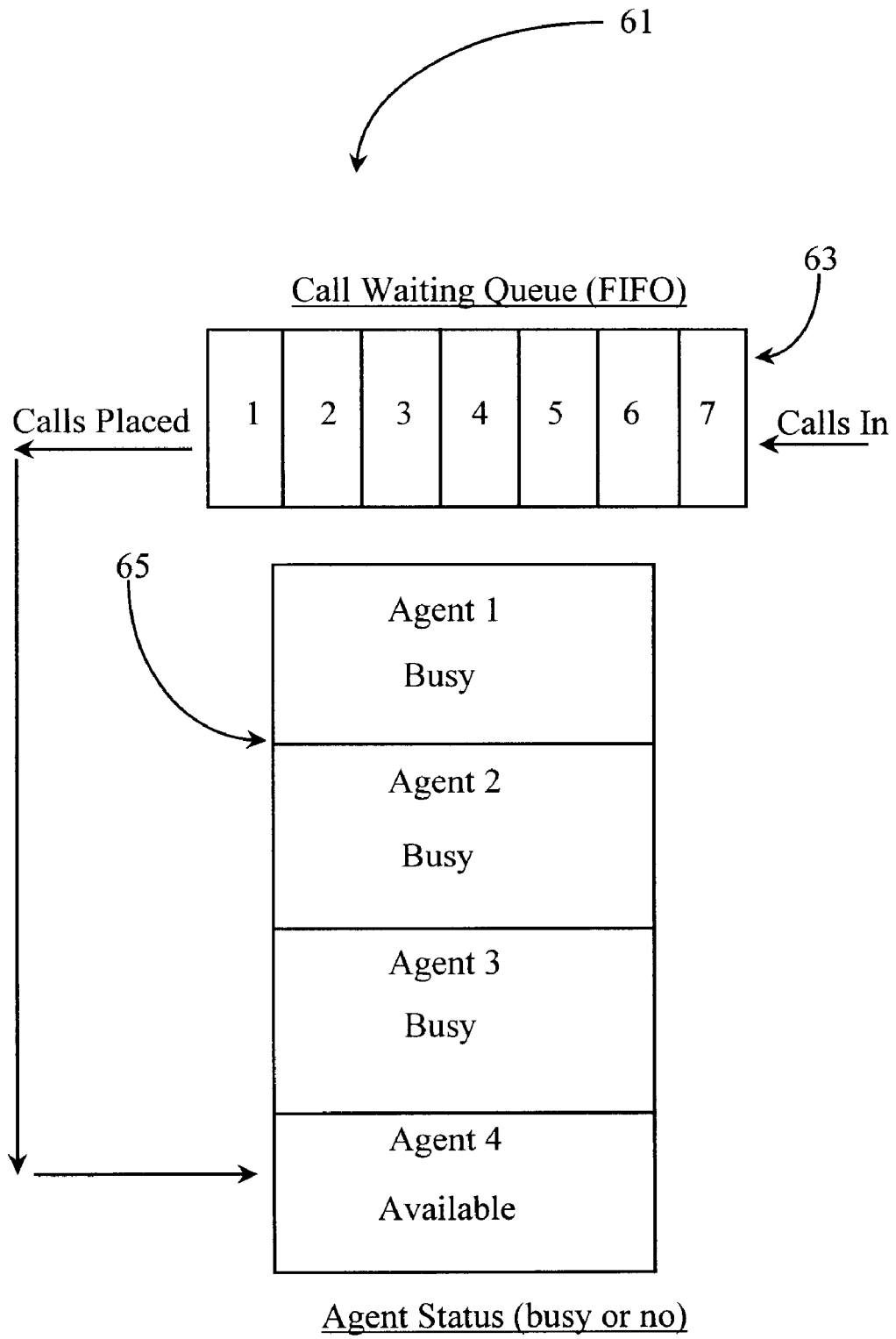
FIG. 2 is a block diagram illustrating a typical call-waiting queue and system according to prior art.

FIG. 2 is a block diagram illustrating a typical call-waiting queue according to prior art wherein there is no priority assigned or multi-state reporting status concerning agent availability. Arriving calls are handled in a first-in-first-out (FIFO) queue 63 and are distributed to an agent group 65. In this prior art illustration queue 63 has 7 calls waiting, numbered 1–7, in the order that they were received. Agent group 65 comprises 4 agents 1–4 and agents 1–3 are busy with prior distributed calls. Agent 4 is determined to be available (not currently engaged in a phone conversation). In this simple prior art situation, call number 1 is distributed to agent number 4 without regards to priority. Calls 2–7 will be placed in order one at a time to next available agents without respect to priority.

Referring now to FIG. 1, a call distribution scheme as illustrated with reference to FIG. 2 may be accomplished by a CTI application executed on processor 23 relative to arriving calls at switch 21. The CTI application monitors switch 21 for incoming calls to a routing or call-distribution point. The status of telephones at agent stations is also monitored, so the application has access to real-time information as to which logged-in agents are busy on a call and which are not. The application operates to command switch 21 to distribute calls on a FIFO basis to logged-in available agents.

In this prior art example, there is no method for determining agent availability with regard to multiple agent states or skill-set. It can also be seen that there is no method for assigning call priority levels to calls 1–7 or using such priority in call routing. It will be apparent to those with skill in the art that the software to accomplish call distribution may be executed on processor 23, or on any other processor connected to LAN 57 with appropriate communication with the CTI application that senses activity of the call center and commands switch 21 or with the switch 21 directly.

Figure 3:
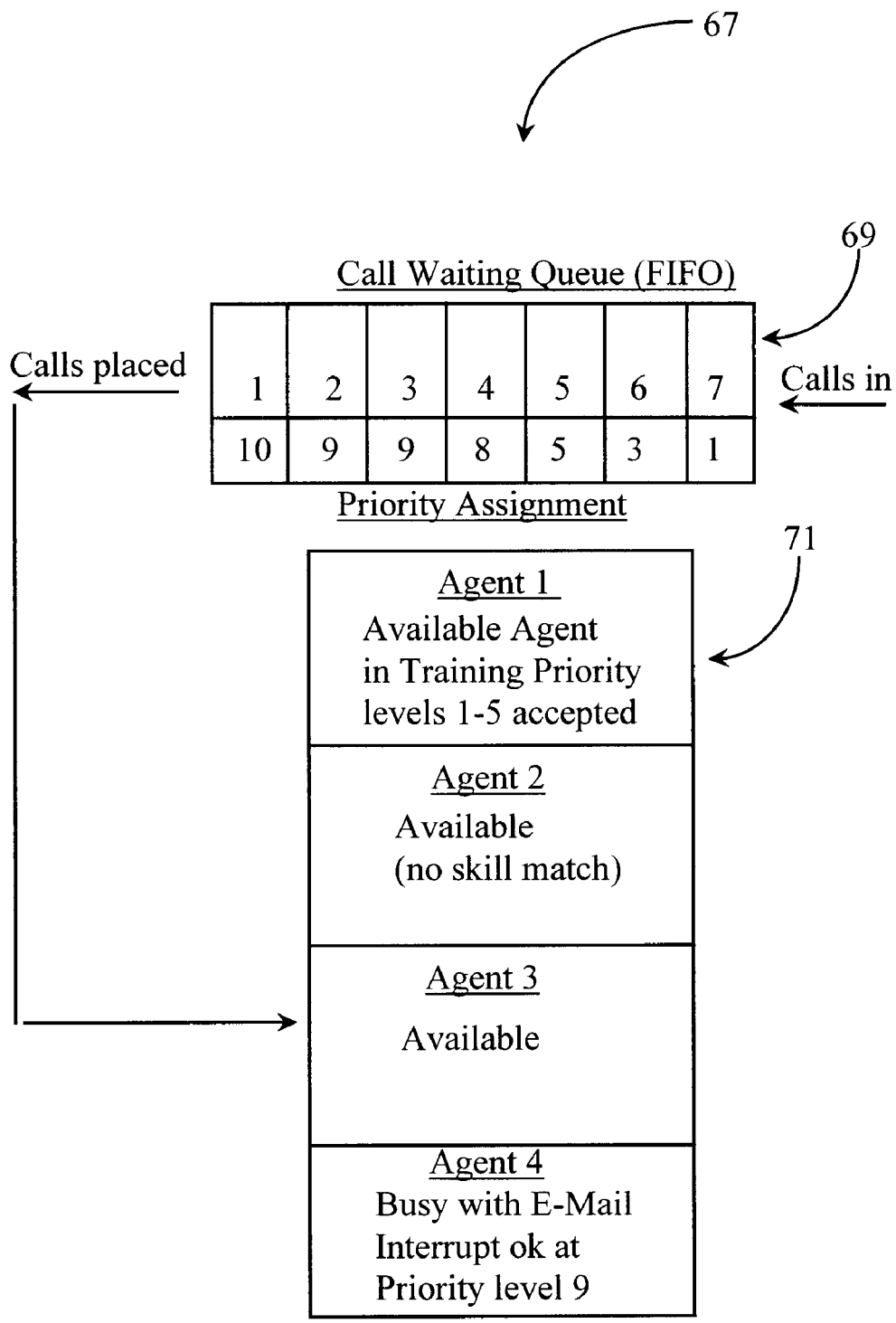
FIG. 3 is a block diagram illustrating a call-waiting queue and system enhanced with call priority assignment and distribution capabilities according to an embodiment of the present invention.

FIG. 3 is a block diagram illustrating a call-waiting queue and distribution scheme enhanced with call priority assignment and distribution capabilities according to an embodiment of the present invention. In the embodiment of FIG. 3 the call distribution scheme comprises a queue 69 and an agent group 71. Queue 69 shows waiting calls 1–7 that have been placed in queue 69 based on a priority determination with an assigned priority level from 1–10 assigned to each call. For example, call 1 has been assigned a highest priority level 10 while calls 2 and 3 have been assigned a priority level 9 and so on. Call 1 is at the head of the queue for distribution not because it was the first to arrive at the routing point in the switch, but because it was found to have the highest priority. The position of all waiting calls in the queue depends on priority assignment. A new call arriving and assigned a higher priority than a call already in the queue will be placed in the queue ahead of the lower priority call, reorganizing the order of the queue.

Software to accomplish the novel priority-based distribution of calls as described relative to FIG. 3 may be executed on any processor accessible to and compatible with a CTI application operating in conjunction with switch 21 in the call center, just as was described for the scheme of the prior art.

To assign priority to incoming calls, and to associate the assigned priority with the call as a sub-state or attribute of the call for management purposes requires a mechanism for according and assigning the priority. This sub-system is represented as process 67 in FIG. 3. It will be apparent to those with skill in the art that there are many sources of information, which may be tapped for this determination. For example, in many call centers, client information may be stored in a database accessible to the priority process (server 43, FIG. 1). Arriving calls have at least a caller-ID, from which may be used as a key to the database. Priority rules may then be established that calls from certain clients are always to be given high priority, or specific priority.

Further to client database, in many enhanced call centers known to the inventors, information may be elicited from callers (clients) at processing points in the network, and the information transferred to the call center with or ahead of the call. This information may be sorted and used according to preprogrammed rules to assign priority. Still further, equipment at the call center may be assigned to interface with callers and to elicit information. That is, an incoming call may be first connected to an IVR for the purpose of determining a client's intent, and then the system may assign priority and place the call in the queue according to the elicited information, or in conjunction with other information. Many such possibilities are extant for priority determination and assignment.

There are combinations of apparatus and rules that may be arranged for priority assignment, as described above. For further example, a call priority system may be as simple as assigning calls a priority level of 1–10. Sales agents may handle calls with priority levels 7–10 while service agents handle calls with priority levels 4–6 leaving calls with priority levels 1–3 for IVR's, automated fax responses, or perhaps, live information agents. Information gathered about the caller at the network level via methods known in the art along with any information already known about the caller is used to categorize the call and assign a priority. The call will be routed based upon that priority assignment. It will be apparent to one with skill in the art that priority level rules may vary widely depending upon the type of business. For example, a sales organization would use different criteria than a service organization. Call priority designations may be based on virtually any type of information known about or elicited from a call and caller. For the purpose of clarity in description, a 1–10 priority assignment is used in examples herein.

The software of the present invention, in one preferred embodiment, as also described above, may be executed in processor 23 or another processor linked to LAN 57 and also linked to telephony switch 21. In some embodiments, however, priority assignment and distribution may be performed either partly or entirely at the network level with software according to the present invention residing in a telephony switch-connected processor within a network such as PSTN network 13.

After placement in the queue for distribution, according to an assigned priority, calls are routed to a next available agent according to further programmed rules. In a preferred embodiment agents at a call center are also assigned sub-states. Some agents, for example, may be agents-in-training, and restricted to rules handling only low-priority calls. Other agents may be reserved for only the highest priority calls, for example.

According to a preferred embodiment, calls in progress with an agent can also be bumped with reference to priority level. In this embodiment, for instance, if an agent at agent station 31 is busy on a priority 6 call, and a priority 10 call comes to the head of the queue, then the priority 10 call would be routed to the agent, and the call in progress would be bumped.

In one embodiment suitable notification is made to the agent regarding the priority status of the next call so that the agent may dispose of the level 6 call in order to handle the more important call. Notification to the agent may be made via PC screen pop-up, audible alert, or any other method known in the art.

In some embodiments the level 6 call may be placed back in queue retaining its priority status with regards to priority stacking within the queue. In other embodiments the displaced call may be transferred directly to another agent (if available), an interactive voice response (IVR) unit, etc. In an embodiment of the invention a lower priority call can be overridden by a higher priority call without losing the original call. Of course, in some embodiments a displaced call could just be terminated. Ideally this would not be the case.

It will be apparent to the skilled artisan that there may be a broad variety of rules and conditions with regards to agents such as incorporating various sub-states such as E-mail duties, setting interrupt rules for particular agents, and so on. For example, an agent residing at agent station 33 may be reported busy because he is answering E-mails and cannot be interrupted by a telephone call unless it is of priority 7 or above. In this case, if there are no other agents available to take the priority 7 call, it will be routed to the agent at agent station 33. He will accept the call and suspend his E-mail duty until he has disposed of the call, and so on.

The method and apparatus of the present invention allows for each agent's time to be best utilized according to skill-set and availability states. The software of the present invention can be integrated with any routing logic used at the call center such as skill-based routing and so on. It will be apparent to one with skill in the art that the method of the present invention may also be used with Internet-based communication and other forms of multi-media communication without departing from the spirit and scope of the present invention. For example, pre-routed E-mails could be assigned priority levels similar to those used with voice calls so that the higher priority E-mails are received and answered before lesser priority E-mails and so on.

In alternative embodiments of the present invention, priority determination and routing rules may be flexible, with reference to other criteria such as time-of-day and relative loading. Such criteria may be set to change automatically and/or to be responsive to administrative input.

As further examples of the flexibility of the systems of the invention, attention is again directed to FIG. 3. Agent group 71 comprises agents 1–4. Agent 1 is an agent in training and can only accept calls having a priority of or less. The rules example illustrated with respect to the active state of agent 1 is indicative of a wide variety of limitations or conditions that can be programmed into the system via a system administrator, or configured by agent supervisor(s). When agent 1 logged-on to the system, his status was made available to reporting software via a database so that no calls above level 5 would be routed to that agent. The active states of agents 1–4 of agent group 71 are shown as reported to routing applications during the instance of placement of call 1. It will be apparent to one with skill in the art that availability status of agents such as agents 1–4 will change in real time as calls are placed. Agent 2 is available, but does not have a particular skill match required by call 1 such as being able to speak Spanish, etc. Agent 4 is reported busy answering E-mails and cannot be interrupted unless a call has a priority level of 9 or above. Agent 4 could receive call 1 except for a fact that agent 3 is determined available and is, in fact, the next available agent for call 1. Therefore call 1 is routed to agent 3.

Assume call 2 requires a Spanish-speaking agent and is now being placed and that agent 3 is now reported busy with call 1 (last placed call) with the status of agents 1, 2, and 4 being unchanged. In this instance, call 2 (now call 1) would be routed to agent 4. The rules example illustrated with respect to agent 4 is indicative of status reporting capability with regards to multiple sub-states with voice calls being a main state of agent availability (known to the inventors).

All calls in queue 69 are routed according to priority and according to agent availability with regards to multiple active states of agents. It will be apparent to one with skill in the art that there may be any number other than calls in queue 69 as well as any number other than 4 agents in agent group without departing from the spirit and scope of the present invention. The inventors choose to show this simple embodiment and deem it sufficient for the purpose of adequately illustrating the present invention.

It will further be apparent to one with skill in the art that the method and apparatus of the present invention may be applied to a call center that is not routing calls according to agent skill-set or agent availability based on a main state and sub states of agent activity. For example, higher priority calls may be routed to a next available agent assigned to that priority level or levels. The routing logic relating to skill-sets and agent availability based on multiple agent states are methods known to the inventors and covered in previous patent applications filed by the inventors. These routing methods are used here only to show the integration possibilities between the software of the present invention and other routing applications.

Figure 4:
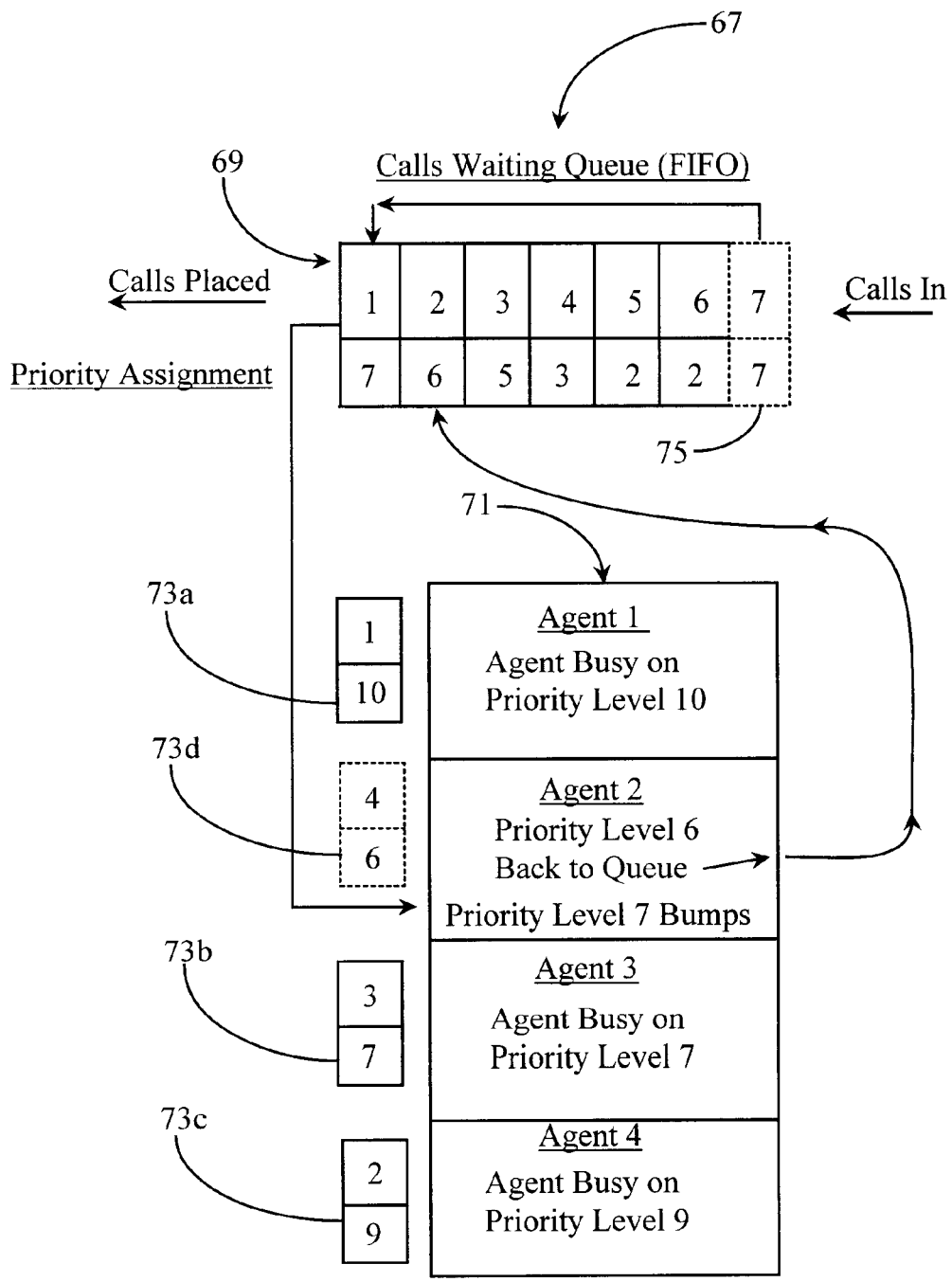
FIG. 4 is a block diagram illustrating the call-waiting queue and system of FIG. 3 showing call priority bumping according to an embodiment of the present invention.

FIG. 4 is a block diagram illustrating the call-waiting queue of FIG. 3 showing call priority bumping according to an embodiment of the present invention, wherein a call of higher priority may be accepted without losing the original call that was bumped. In FIG. 4 all agents are busy and a priority call is to be routed. Calls in the queue are shown from the head of the queue in descending order of priority, because as new calls come in, process assigns priority to the call and places the call in the queue (assigns order of placement) by descending order of priority assigned.

As an additional feature, call interruption may be prevented on low priority calls past a certain point in the script, to avoid "churning" of resources, where the redirection could take longer than finishing the call.

In this example, agent 1 is reported busy with a priority 10 call and cannot be interrupted by a lower priority call. Agent 3 is reported busy with a priority 7 call and cannot be interrupted with a same priority call. Agent 4 is reported busy with a priority 9 call and cannot be interrupted with a lower priority call. However, it is determined that agent 2 is busy with a priority 6 call and can be interrupted with a higher priority call. In this instance, call 1 is routed to agent 2 with an alert to the agent via screen pop-up, or other method known in the art, to dispose of call 6. In this case agent 2 sends the priority level 6 call back to queue 69 where it is promoted based on priority to call number 2 for re-routing. Agent 2 is now free to accept call 1. Agent may have more options with regards to disposing of the priority level 6 call in other embodiments without departing from the spirit and scope of the present invention such as transferring to another agent, transferring to an automated voice response unit, etc. Also, the bumping could be completely automatic without further agent participation.

It will be apparent to the skilled artisan that features of the present invention may be practiced with other mediums of communication than voice calls without departing from the spirit and scope of the present invention, such as E-mails, Faxes, Video calls, and other types of multi-media communication mediums that can be utilized within a multi-media call center. For example, general address E-mails arriving from Internet 15 (FIG. 1) may be queued with priority assigned so that high priority E-mails are sent to designated agents and so on. With respect to Internet Protocol Network Telephony (IPNT) calls, for example, the calls could have priority assigned and be queued in much the same way as voice calls, except the distribution would be by routing to agent's PCs by way of LAN 57. Such a queue could be accomplished in processor 23 of FIG. 1, or on another server on the LAN, and be automated such that calls are routed according to programmed rules based on priority assignment, and also with reference to recorded agent skills.

It will also be apparent to one with skill in the art that the present invention can be applied to virtually any type of communication that can be received by an agent via telephone channel or computer connection, such as by LAN 57, without departing from the spirit and scope of the present invention. These include, but are not limited to COST calls, ISDN calls, E-mails, transferred word documents, IP calls, Video calls, Faxes, and other types of communication media such as may be known in the art. It will further be apparent to one with skill in the art that different priority levels may be applied to different modes of communicating without departing from the spirit and scope of the present invention. For example, COST calls may be programmed with a certain priority system while automated systems such as IVR systems may be programmed under a different priority system within the same call center, and under different rules than applied to the COST calls. A wide variety of differing embodiments are possible within a given call center, or in communication networks.

Fair Access in Reserving Agents

As described in the background section, latency variations inherent in different routing systems can cause inadvertent priority states (not related to assigned priority states described above) to exist for callers and groups of callers attempting to secure available agents in a communication center. The inventors provide a CTI system and software routine that eliminates or at least significantly reduces undesired priority states that may exist due to such latency differences.

The following enabling disclosure in this section will describe only the method and apparatus of the present invention that deals with the elimination of inadvertent priority states caused when more than one separate network-routing system having differing latency characteristics attempt to reserve agents in one communication center. Priority assignment with respect to queuing individual calls, which was described in FIGS. 1–4 above will not be discussed in this section for the sake of simplicity.

Figure 5:
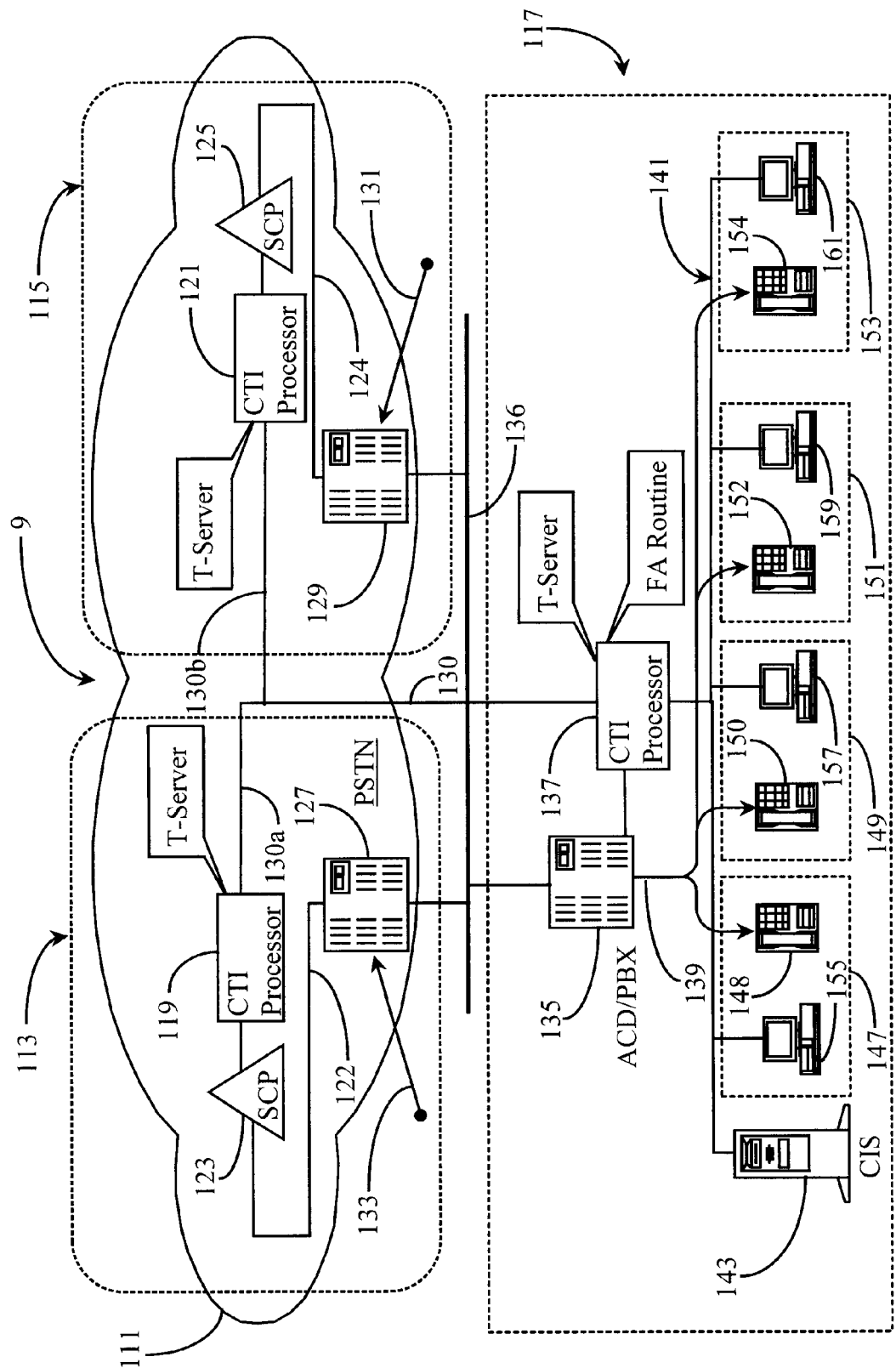
FIG. 5 is an overview of a network communication system enhanced with a fairness timing routine according to an embodiment of the present invention.

FIG. 5 is an overview of a network communication system 9 enhanced with a fairness-timing (FA) routine according to an embodiment of the present invention. Communication system 9 comprises a telephony network 111 and a connected communication center 117. Network 111 may be a PSTN network, an IPNT network, or a combination of the two. In this example, network 111 is a PSTN network and will serve to describe examples of the present invention.

Communication center 117 may be a large CTI service center, or any other type of CTI-enhanced communication center. Center 117 may also be capable of IPNT communication in combination with COST communication. In this example, communication center 117 is a CTI-enhanced telephony center and will serve to enable explanation of the present invention.

It is known that there are many separate routing systems that may exist within a PSTN network such as network 111. Two such systems illustrated herein are system 113 and system 115. Systems 113 and 115 are separate from each other in that they use separate equipment and connection lines as well as separate router intelligence to route telephony traffic. Systems 113 and 115 represent any two routing systems in network 111 that are not local to each other in a geographic sense.

Routing system 113 has a local telephony switch 127 adapted to receive calls from individuals operating in that locale. Switch 127 may be an ACD or PBX type switch, or any other type of telephony switch that may be known in the art. An incoming call represented by a vector 133 is illustrated as arriving at switch 127.

In this example, switch 127 is connected by a telephony data line 122 to a SCP 123. SCP 123 provides routing decisions to switch 127 for calls 133. For example, calls from individuals using a 1-900 number, a 1-800 number, or the like for contacting communication center 17 are routed by SCP 123.

SCP 123 is enhanced by a CTI processor 119. Processor 119 enhances functionality of SCP 123 by virtue of software provided by the host of communication center 117. Such software enables communication center 117 to control routing of calls within network 111 according to enterprise rules. For example, an instance of a CTI application known as T-Server (known to the inventors) is provided and executable on processor 119. T-Server software provides a wide variety of intelligent routing routines that may be executed to determine how SCP 123 will route calls.

Routing system 115 has an equipment and connection scheme that, for the purpose of this invention, mirrors the components and elements in system 113. For example, a CTI switch 129 is provided and adapted to receive calls 131 from individuals in that locale. Switch 129 is connected to a SCP 125 by a data connection 124. A connected CTI processor 121 running an instance of T-server software enhances SCP 125.

It will be apparent to one with skill in the art that the equipment and exact connection schemes may vary from one routing system to another within network 111. However, the inventors illustrate identical schemes in each illustrated routing system 113 and 115 for the purpose of simplifying explanation of the present invention. Moreover, in a network such as PSTN 111, there may be many more separate routing systems than are illustrated here. However, the inventors deem that the illustration of two such systems in this example is sufficient to explain the present invention.

Both routing systems 113 and 115 are used to route incoming calls to communication center 117. To this end, communication center 117 is appropriately equipped to receive calls routed thereto by system 113 and system 115. For example, communication center 117 has a CTI telephony switch 135 that is adapted to receive calls from network 111. Switch 135 may be an ACD, PBX, or any other type of telephony switching system that is known in the art. Switch 135 is CTI-enhanced by virtue of a connected CTI processor 137 running an instance of T-server software. Switch 135 acts as a central switch for communication center 117. That is, all calls arriving from network 111 are received at switch 135 and distributed to individual agent stations 147–153.

Switch 135 is connected, by virtue of internal telephony wiring 139, to a plurality of agent-manned telephones 148, 150, 152, and 154. Telephones 148–154 are implemented one each at separate agent workstations 147, 149, 151 and 153 respectively. Stations 147–153 are equipped with agent-operated personal computer/video display units (PC/VDU's) that are connected to each other, and to a customer information server (CIS) 143 by a local area network (LAN) 141.

CTI processors 137 (center 117), 119 (routing system 113), and 121 (routing system 115) have digital networks 130a and 130b separate from telephony trunk lines 136 over which voice calls are routed. Networks 130a and 130b are adapted to enable data communication between such connected CTI processors. Communicated data may include such as command and control data, call information data, and the like. In this way, information about a call may arrive at communication center 117 ahead of an actual routed call. This allows agents operating at workstations such as stations 147–153 access to pre-event information and better prepares them to handle incoming calls. Separate links 130a and 130b are depicted to emphasize that call latency may well differ. In reality, routing latency may differ even if the two routing systems share the same digital network.

In an enhanced telephony communication system such as system 9 described above, incoming calls 133 and 131 are routed from respective switches 127 and 129 to switch 135 over telephony infrastructure represented herein by trunk 136, which represents varied and alternative routing paths through network 111.

It will be appreciated that, in actual practice, routing systems 113 and 115 as well as network paths through infrastructure 136 will, in many cases, exhibit different latency characteristics. For example, routing system 113 may have older and slower equipment and slower network connections than routing system 115. If so, then routing system 113 will exhibit a higher latency for transactions with center 117 than will routing system 115. This latency difference can cause groups of callers from system 115 to enjoy, without design, better access to available agents in communication center 117. This is at least partly due to the requisite nature of telephony routing protocol. A network router must request a routing event, receive information regarding routing options, and only then can the router route the call from the local switch to a communication center.

A request for a routing event by a network router in embodiments of the present invention is made over the same network data links (130a, 130b) that are used for parallel data transfer, as described above. The request can be a negotiation between processors separate from the transfer of data from a network routing system (113, 115), or it may be combined with the data transfer. Similarly, in some embodiments of the invention the identity of the network router needs be known, and this piece of information may also be combined in the parallel data transfer for a pending call.

It will be apparent to the skilled artisan as well that the examples of the invention described with reference to two network routing systems (113, 115) are not limiting. Call requests may be negotiated in a call center with network routers as shown and described, but also between a call canter and other entities. Requests for routing may come from overflow at another call center, or in a load-balancing arrangement with several other centers, for example. The practice of the invention applies to all architectures wherein call reservation requests may come to one center from another source.

To alleviate the problem of inadvertent preference or priority as stated above, the inventors provide herein a software routine termed a "fair access" (FA) routine. The FA routine executes on CTI processor 137, and may be integrated with T-server software. The inventors illustrate the FA routine separately from T-server software simply to show separate function. The FA software provides a fairness timer function each time an agent is reserved, and denies access to that agent to any incoming request route until the time period has expired. When the fairness time expires, than access is awarded to a call based on an algorithm that awards access based on a round robin system or a performance history of each routing system.

In actual practice, the FA routine is integrated with other CTI applications and routines that may be in place at communication center 117 and in network 111 by virtue of T-server software. By using the FA routine, communication center 117 can provide more equal and fair agent access to separate routing systems such as systems 113 and 115, regardless of their latency characteristics. A detailed description of a T-server routine enhanced with the FA routine of the present invention is provided below.

Figure 6:
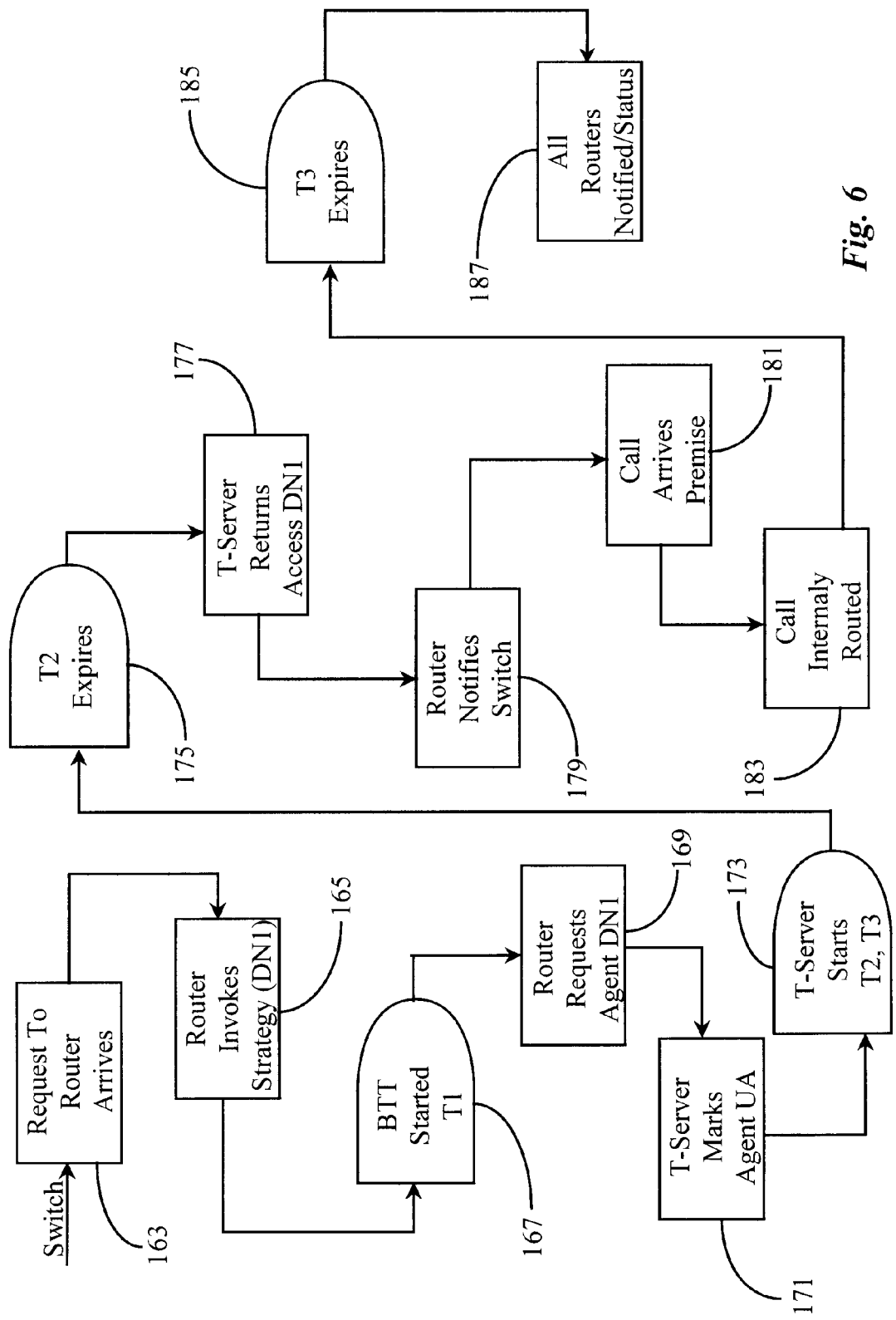
FIG. 6 is a process flow chart illustrating steps for reserving and connecting to an agent using a single router according to an embodiment of the present invention.

FIG. 6 is a process flow chart illustrating steps for reserving and connecting to an agent using a single router according to an embodiment of the present invention. The exemplary process represented herein illustrates a T-server routine integrated with a FA routine being executed for one call request made by one routing system such as system 113 of FIG. 5. This example may be used in conjunction with elements described in FIG. 5 to gain an understanding of the unique FA software. Therefore, many references will be made to elements of FIG. 5 throughout following example.

At step 163, a request to route arrives at a SCP such as SCP 123 (router) from a local network switch such as switch 127. The request is initiated by call 133, which is waiting to be connected to an agent at center 117. At step 165, SCP 123 invokes a routing strategy based on information from or about caller 133 and T-server software running on CTI processor 19. The strategy invoked in step 165 includes the selection of a destination number (DN1) for an agent at communication center 117.

At step 167, a busy treatment timer (BTT), or T1, is started at SCP 123. The BTT (T1) determines how long a call must be held at a routing point before parking it in queue. Ideally, the BTT time period should be less than the maximum required response time (RRT) minus network round-trip latency (SCP 123 to CTI processor 137) minus T-server and router processing latencies. For example, if RRT equals 500 ms and round-trip delay (RTD) equals 60 ms, and T-server/Router latency is 210 ms, then the BTT for call 133 should be set for 230 ms.

At step 169, SCP 123 requests an agent from T-server software running on CTI processor 119. Such an agent may be one operating at workstation 153 taking calls at telephone 154 on DN1, which may be, in this example, the number for telephone 154. At steps 171 and 173 T-server software running on processor 137 marks the agent at workstation 153 unavailable and starts an FA timer (T2), and an agent reservation timer (T3). The FA timer sets a period of time during which other routing systems may request access to a same agent, before one router will be granted access to the agent. In this example, however, there are no competing requests. No access is granted to any requesting router until T2 expires in step 175.

When FA timer T2 expires in step 175, T-server software running on processor 137 returns access confirmation for DN1 to SCP 123 at step 177. At step 179, SCP 123 notifies switch 127 to route call 133 to DN1. At step 181 call 133 arrives at switch 135. Having successfully acquired access to the agent at workstation 153, call 133 is internally routed in step 183 to telephone 154 over wiring 139.

At step 185, T3 (agent reservation timer) expires but the current agent status reported to network routers such as SCP 125 is that the agent is busy with call 133. At step 187, all network routers are updated of DN1 status, which is busy.

FA timer (T2) is necessary to provide fair distribution of available agents between all separate routing systems competing for connection. Without T2, the routing systems with the shortest latency periods would acquire preferential access to all agents, as they became available. If all routing systems have the same delay factor (highly unlikely), then the T2 timer may be set to zero.

It is found through empirical method that in some cases the value of T2 should be about two times the difference in latency between the most geographically distant, and the closest network routers, which are configured in the loop. The latency factors for each network router should be measured at approximately 95% delivery-probability time. This will insure that 95% of all calls will be processed according to a fair distribution algorithm.

It will be apparent to one with skill in the art that the example presented above involves only one network router requesting an agent. Therefore, a fairness algorithm was not invoked in this example. If another router had requested an agent during time period T2, then a fairness algorithm would be called once T2 had expired. An example of more than one router competing for an agent is provided below.

The agent reservation time T3 is the time that agents are marked as unavailable when they are reserved for a call. This time period is long enough for a reserving voice call to be routed through network 111, arrive at switch 135, be presented to the agent, and notification of agent status to be sent to all other network routers. If this time period is set too short, then there is a chance that one agent will receive two calls. If T3 is set for too long a period, the agent may be idle well after he has terminated the last event. A suggested time limit is approximately 10 seconds.

If agents in a communication center such as center 117 are routinely handling very short calls of only a few seconds or so, T3 may be canceled and an event-release detection (ERD) routine (known to the inventors) may be incorporated in T-server software running on CTI processor 137 (FIG. 5). An ERD routine detects released events for each agent at each DN and sends notification to all network routers.

It will be apparent to one with skill in the art that the process steps above may vary somewhat according to enterprise rules without departing from the spirit and scope of the present invention. For example, there may well be additional steps as well as sub-routines involved in actual practice. The inventors intend that the process steps illustrated herein only to be one example of a basic routine using only one router. A more complex interaction is provided below.

Figure 7:
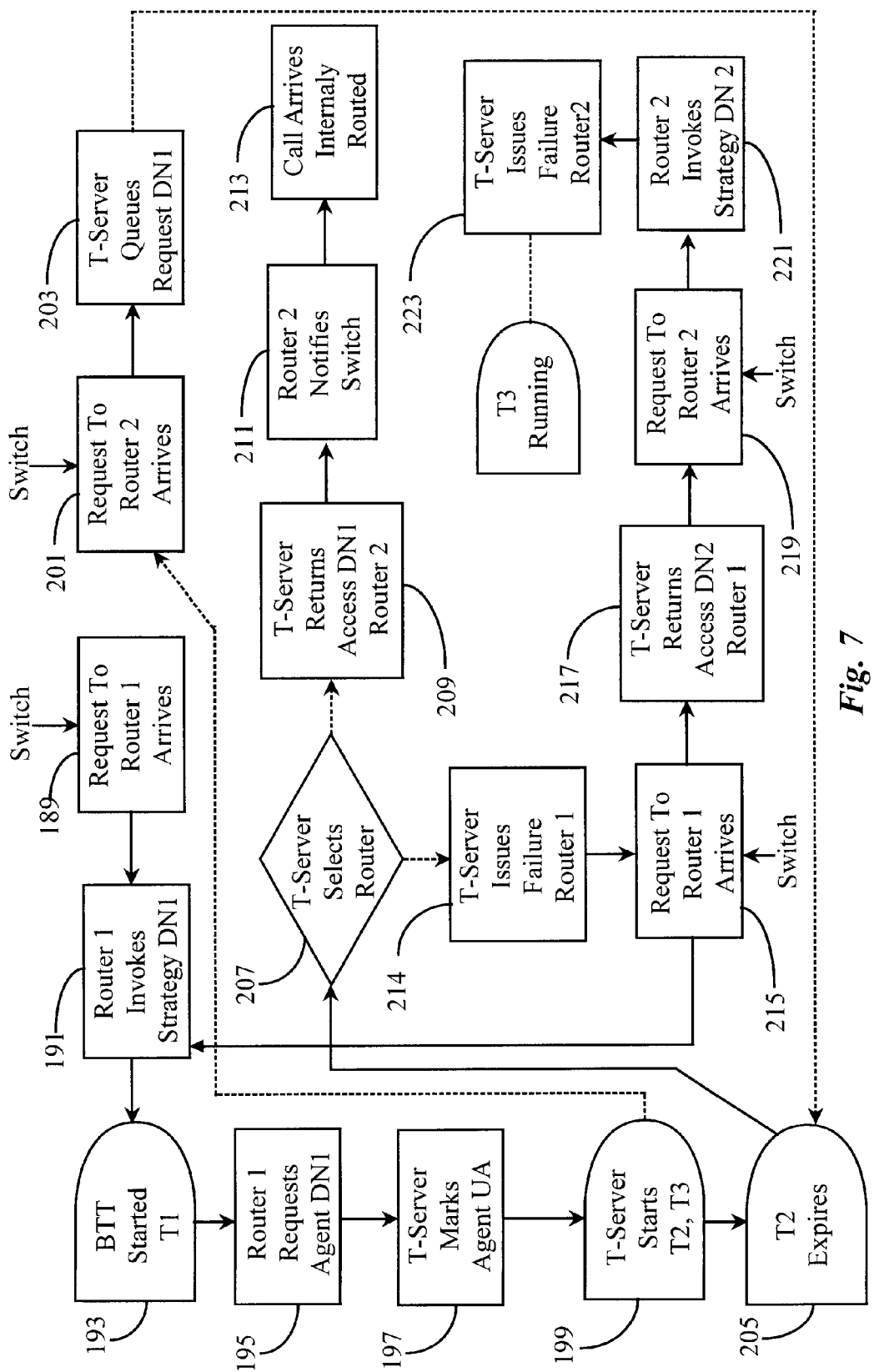
FIG. 7 is a process flow chart illustrating steps for determining which of two network-level routing systems will be granted access to an agent according to an embodiment of the present invention.

FIG. 7 is a process flow chart illustrating steps for determining which of two network-level routing systems will be granted access to an agent according to an embodiment of the present invention. As with the example above referencing FIG. 6, the embodiment of FIG. 5 and elements contained therein will be referenced throughout this example.

At step 189, a route request arrives at SCP 123 from local switch 127 on behalf of call 133. SCP 123 invokes a routing strategy and selects DN1 in step 191. At step 193, a busy treatment timer T1 is started. At step 195, SCP 123 requests an agent on DN1. At step 197, T-server marks the agent as unavailable. In step 199, T-server starts T2 (fairness timer) and T3 (reservation timer).

Note that the above-described process steps are the same as steps 163–173 described in FIG. 6, however, before T2 expires, a second routing system comes into play. Following the broken direction line from step 199, at step 201, a route request arrives at SCP 125 of routing system 115. The request arrives from local switch 129 on behalf of call 131. SCP 125 (competing router) repeats steps 191, 193, and 195 for a request of DN1. At step 203, T-server (processor 137 at center 117) queues the request for DN1 by SCP 125. It is noted here that SCP 123 has already reserved the agent at DN1, therefore, T2 and T3 have already been started (step 199). If additional routing systems (none shown) make requests for DN1 during the time period of T2, the requests will also be queued by T-server software running on processor 137.

Following the broken direction line from step 203, in step 205, T2 expires. Step 205 triggers step 207 as indicated by the solid direction line. In step 207, T-server software, by virtue of a FA routine employs an algorithm to determine which requesting routing system 113, or 115 (FIG. 5) will be granted access to DN1. The fairness algorithm may, in one embodiment, be based on an arbitrary rotation scheme between network routers such as SCP's 123 and 125. In another embodiment, statistical analysis may be used to keep individual percentages of granted requests to each routing system fairly even. This method would also take into account total requests from each routing system so as not to penalize one system for lack of requests. The fairness algorithm may be any one of many possible schemes. Employing the fairness timer (T2) insures that unintentional preferences or priorities are cancelled out for all routing systems.

At step 209, T-server employing the FA routine returns access for DN1 to router 2 (SCP 125) even though router 1 (SCP 123) was first to reserve an agent at DN1. At step 214, illustrated below step 207, T-server issues a failure notification regarding DN1 to SCP 123 in system 113. Steps 209 and 210 occur simultaneously and are indicated by broken direction lines emanating from step 207. Steps 211 and 213 represent the routing of call 131 from switch 129 to switch 135, and further internal routing to an agent at DN1, in this case one picking up telephone 154 at workstation 153.

Moving to step 215, another route request from local switch 127 to SCP 123 (router 1) arrives. Following the broken direction line from step 215, the process repeats steps 191–205, however in this case SCP 123 selects DN2 in the routing strategy (191). When T2 expires for DN2 (205), T-server returns access for DN2 to SCP 123. In this case no competing router made a request for DN2 during T2 time, therefore access was granted to SCP 123 (step 217).

At step 219, another route request arrives at SCP 125 from local switch 129. SCP 125 invokes a routing strategy in step 221 and selects DN2. However, the T3 timer (agent unavailable) invoked in step 199 for the agent at DN2 is still running. Therefore, T-server issues an immediate failure notification to SCP 125 in step 223. It will be noted here that while T2 and T3 timers are both running, competing requests for a same agent are queued as in step 203. At the end of T2 time, the fairness algorithm determines which router will get access. After T2, but during T3, the agent will be unavailable to all routers until T3 expires, unless an ERD routine is in place as described in FIG. 6.

It will be apparent to one with skill in the art that the process steps described above may vary according to communication center capability and enterprise rules without departing from the spirit and scope of the present invention. There may be added routines, and sub routines included and integrated with the various routing strategies of a communication center such as center 117.

Promoting Fairness by Varying Fairness Time

It was previously disclosed above that the fairness time ($T_2$) is defined as a length of time that any routing system must wait for reservation confirmation when requesting a particular destination number (DN). The purpose is to promote fairness, allowing other routers to request the same DN during the time $T_2$, after which a fairness algorithm awards the DN to one of the requesting routers. The timer for $T_2$ is started at the instant that a first request for a particular DN is received from any routing system. A round robin system or statistical analysis, for example, is used to determine which of the routing systems will actually get confirmation of the DN.

In the embodiments above-described, the fairness time imposed, during which other routers may also request the same DN requested by a first router, is a constant time, computed by one or another algorithms based on latency. There are other ways a timer may be used to promote fairness, some of which are relatively simple, and others of which are more complicated.

A simple fairness system monitors and stores latency values for individual routers, and imposes a wait time for any request from a router, based on that routers current latency. A fast router is assigned a longer wait time, and the slowest router never waits at all.

In another, more complicated alternative embodiment, $T_2$ would not be specific to a particular destination number. Instead a delay timer is started for any request, such that all systems must wait before being noticed as requestors of any DN. Therefore $T_2$ is considered a wait time. A second time period of $T_3$ (fairness time) may be provided and started after a first routing system is noticed and confirmed requesting a particular DN.

In this embodiment, all routing systems such as systems 113 and 115 of FIG. 5 are periodically monitored for average latency. Latency for this purpose is defined as the time it takes each routing system to receive and log a request for a DN into the communication center's switch such as switch 135 of FIG. 5. Latency monitoring may be performed periodically or continually by methods known in the art. In this case all routing systems must be identified in terms of equipment type and network connection, and their network routes must be known.

The average latency factor over all routing systems is then used as an imposed fairness constant, meaning that each request arriving under the fairness constant must wait the difference of their stated latency average and the fairness constant before being noticed. A slower system whose latency exceeds the fairness constant is not forced to wait any time.

$T_3$ time may be started when a first routing system is noticed requesting a particular DN as described above. For example, assume that systems 113 and 115 are faster than the fairness constant, and that requests from both systems come in at the same instant for a same DN. If system 113 waits 50 ms $T_2$ time, and system 115 waits 60 ms $T_2$ time, then a $T_3$ time is imposed at the expiration of 50 ms (system 113). After 10 ms, system 115 is recognized and queued for the same DN. $T_3$ time, in this embodiment, may be much shorter than the $T_2$ time described in the previous embodiment described above as the faster routing systems are buffered before being officially recognized at center 117.

In this way, a slower routing system may still compete with faster systems. All systems are continually monitored for their current latency due to the fact that these figures will not remain constant over long periods of time. Therefore, the latency constant for a communication center may constantly change. Moreover, wait times for each separate system are continually adjusted against the latest data.

As a further example, consider three separate routing systems A, B, and C that are routing requests to a communication center such as center 117 (FIG. 5). If system A is operating with a 100 ms latency, system B at 300 ms latency, and system C at 60 ms latency then the average latency for all three systems is 153.33 ms latency. If there are no other systems routing to communication center 117 then the fairness constant is set at 153 ms.

When a request for a DN arrives from system C (fastest system), then a fairness time of 93 ms must expire before a DN request is noticed. System A requires an additional 53 ms of fairness time before a DN request is noticed. This insures that both systems A and C wait the standard time before either one can be considered for an available DN. However, system B has a latency factor that exceeds the fairness constant. In this case, no fairness time is imposed. This insures that the slower systems may compete with the faster systems in reserving available agents.

At first glance, the system does not seem fair because if all three systems compete for a DN, and have initiated their requests within a few ms of each other, systems A and C will move to a $T_3$ time and be included in a fairness algorithm at the expiration of $T_3$ before the request from B is even received. In this case A or C will get the DN and the DN will be unavailable to B. However, if any request is received from B wherein there are no other requests for the same DN yet received by systems A or C, system B is immediately awarded the DN reservation without moving to a fairness algorithm because no wait time is imposed. If a request for a same DN arrives from system B during a wait time ($T_2$) imposed on A, C, or both, then B will still get confirmation because A and C are not yet noticed. If a request arrives from B during a $T_3$ fairness time for systems A and/or B, then the fairness algorithm is invoked to include system B giving it a chance to be considered for the DN number.

In one embodiment, fairness time $T_3$ may be set to equal the latency rate of the slowest routing system. This would give system B a chance to get into the fairness algorithm if the requests were initiated at the same time, or the request from B was initiated slightly ahead of the faster routing systems.

In actual practice, many requests may come in at any time for any available DN's and only the systems that perform faster than the calculated latency average of all systems routing to communication center 17 are delayed with a wait time ($T_2$) in order to buffer them to the average latency figure.

If there is more than one routing system that has a latency greater than the fairness constant competing for one DN, then the fairness algorithm may be invoked for those systems. This would require that requests from those systems arrive within a time period reserved for processing one successful request, as no formal fairness time would be imposed. For example, if a system A and a system B both have latencies that exceed the average fairness constant and their requests arrive in the order of A and then B, then B will be considered as long as the DN has not yet been released to A.

Integrating Priority Assignment and Fair Access

As described in the background section, a desirable goal, and an object of the present invention is to integrate the capabilities of a priority queuing routine (FIGS. 1–4) and a fairness access routine (FIGS. 5–7) such that incoming callers that enjoy certain priority states in a communication center and may also have fair treatment when attempting to reserve available agents regardless of any latency difference resulting from separate network-routing sources.

In a previous embodiment described above, call priority queuing is preferably performed in a communication center queue such as queue 67 of FIGS. 3 and 4. However, it was also mentioned that priority assignment might also be performed at the network level. For the purpose of the present invention, it will be assumed that an integrated system wherein priority assignment and fairness treatment is practiced will have priority assigned, preferably, at the network level such that priority is already known when a request to reserve an agent arrives. Moreover, for the present discussion it is assumed that a uniform priority assignment scheme is practiced among all of the routers routing to a single communication center. However, assigning priority within the communication center is also possible in various embodiments without departing from the spirit and scope of the present invention.

FIG. 5 and elements contained therein is referenced for the purpose of explaining the dynamics of an integrated system of priority and fairness treatment. This is because the exemplary architecture of FIG. 5 represents two separate routing systems, and has appropriate CTI architecture in place at the network level to practice the integrated invention.

Referring now to FIG. 5, CTI processors 119 and 121 in network 111 are running an instance of T-server software (known to the inventors) that allows SCP's 123 and 125 to perform various intelligent routing routines such as routing by skill level, statistics, agent availability, and so on. As previously described above, SCP's 123 and 125 make requests and perform routing on behalf of calls destined to center 117 such as calls 133 and calls 131 respectively.

Criteria for assigning priority to calls may be implemented in T-server applications running on processors 119 and 121. Any rules may be used to determine a priority scheme. In one embodiment, such rules may include interactive voice response (IVR) interaction with a caller at the network level in order to determine a priority level for the particular call. Based on the interaction, a priority level is tagged to the request.

In other cases, known information may be accessed about callers from CIS server 143 in communication center 117. For example, SCP 123 is notified of a call 133 at switch 127 that according to destination information should be routed to communication center 117. SCP may, by virtue of T-server software running on processor 119, request data about the caller from CIS server 143 over digital links 130 and 130a. Such data may be used to assign a call priority level. In other cases such caller data may already reside in a statistics server at the network level, and may be updated on a continuous basis from the call center level.

In one case, a priority level will be assigned to a call such as call 133 before a request to reserve a DN is initiated. In this way, priority level is known at center 117 upon arrival of a reservation request prior to an actual call arriving at such as switch 135 in center 117. In this case the priority may be included in a DN request to the communication center, so two separate data instances will not be needed. In another case, a request for a DN may be initiated at SCP 123 without a priority yet assigned. In this case, priority my be assigned at center 117 with priority level notification sent back to SCP 123 with a successful DN confirmation. In either case, a priority level is known at center 117 before the actual call (133) is routed. Therefore, a priority queue may be held at switch 135 and calls queued accordingly as described in FIGS. 3 and 4. Alternatively, a virtual queue may be held at individual SCP's such as SCP 123 in network 111.

In one aspect of the present invention, a DN is allowed a certain number of calls to be held in queue before being marked as unavailable. In this embodiment requests for same DN numbers are granted until the priority queue is full. Once the priority queue if full then the DN is marked unavailable unless a higher priority request comes in. If this happens, a lowest priority call in queue is either transferred to an overflow queue, to an IVR, or it may be dumped.

It was disclosed above in reference to fairness treatment that a $T_2$ time is, in one embodiment, generic to a particular DN, and the fairness algorithm is employed when more than one separate routing system is requesting the same DN within the allotted time period. In this embodiment, competition between separate routing systems requesting a particular DN may also include a parameter of known priority.

Using FIG. 5, assume that system 113 and system 115 are requesting a DN that is an agent operating at station 153 using telephone 154 in communication center 117. Call 133 has been assigned a level 9 priority while call 131 has been assigned a 5 priority using a 1–10 rating system.

Assume that the priority queue limit in switch 135 at center 117 is 10 calls before the agent at station 153 is deemed unavailable. If there are 9 calls in queue with the lowest priority being one call at a level 4, only one more confirmation for a DN at station 153 may be made. At the end of $T_2$ time, calls 133 and 131 must go to fairness algorithm. In this case, the fairness algorithm takes priority level into account when making a decision. Therefore SCP's 123 and 121 both receive successful notification of DN reservations. Call 133, a level 9 call, is routed to switch 135 and queued accordingly. Call 131 is also routed to switch 135 and bumps the level 4 call in the queue thereby becoming the last call in the queue. The level 4 call may be transferred to a general queue, to an IVR, or some other automated response system.

The rules governing the fairness algorithm may vary with respect to priority level. For example, if a fairness algorithm is employed for separate routing systems wherein there is, for example, a 7 priority or higher, then priority may be considered over statistical figures regarding number of DN awards. If no priority level is 7 or higher then the fairness routine may be instructed to ignore priority and stick to a round robin or other statistical award system.

In the simple case of assigning a wait time to faster routers with the time length based on latency (inverse relationship) known priority may simply be used as another factor in determining the wait time. For example, a fast router may be accorded a long wait time due to its speed over other routers, but that time may be foreshortened for high priority calls, such that there will be no wait time at all.

Calls arriving from separate routing systems will exhibit random priority levels such that awarding on priority should not be construed as unfair as long as an overflow system such as an IVR or, perhaps, an agent of lesser skills is available to handle any bumped calls.

Another embodiment utilizes the fairness scheme described above wherein separate routing systems are assigned varying wait times based on their latencies against an average latency constant. In this embodiment, faster routing systems must wait until the average latency time is met from the point of request initiation to arrival at switch 135+any difference required to equal the average latency figure currently accepted in the communication center before being noticed for a DN request. Routing systems that are slower than the averaged constant are not forced to wait. In this embodiment, priority levels may also be considered when running a fairness routine.

In a case where priority is set at individual SCP's then such priority levels, if high, may be used to subtract incremental amounts of wait time $T_2$ associated with routing systems that are faster than the average latency. Likewise, if such priority is low then incremental time periods may be added to $T_2$. Moreover, such incremental time adjustments may be made to $T_3$ time instead.

In still another embodiment, priority levels may be set at communication center 117 instead of at the network level, with priority status sent back with each DN confirmation. In this embodiment, priority level may be based on additional information held at communication center 117 such as in CIS server 143. In this case, priority level is tagged to the actual incoming calls arriving at switch 135, and calls arriving may be queued accordingly.

It should be apparent to one with skill in the art that fairness treatment routines may be integrated with priority assignment at the network level, in communication center 117, or in a combination of both. For example, in an agent level routing environment wherein separate routing systems route calls directly to agents working in a communication center such as center 117, virtual priority queues may be held at individual SCP's. Actual priority queuing may be performed at a communication center switch such as switch 135. There are many variant possibilities.

It should also be apparent that there may be many routing systems of varying latency rates connected to one or a number of communication centers practicing the present invention. In this case there may be premise-to-premise routing. Such cases are handled in the same fashion as network-to-premise cases.

Priority Based on Real Time Contribution (User Control)

The goal of the present invention is to provide clients of a service-based business that has interface to clients through at least one communication center, an opportunity to alter priority assignment to an active or reserved position in queue by contributing something of value that would, when realized at the center, trigger queue advancement.

Figure 8:
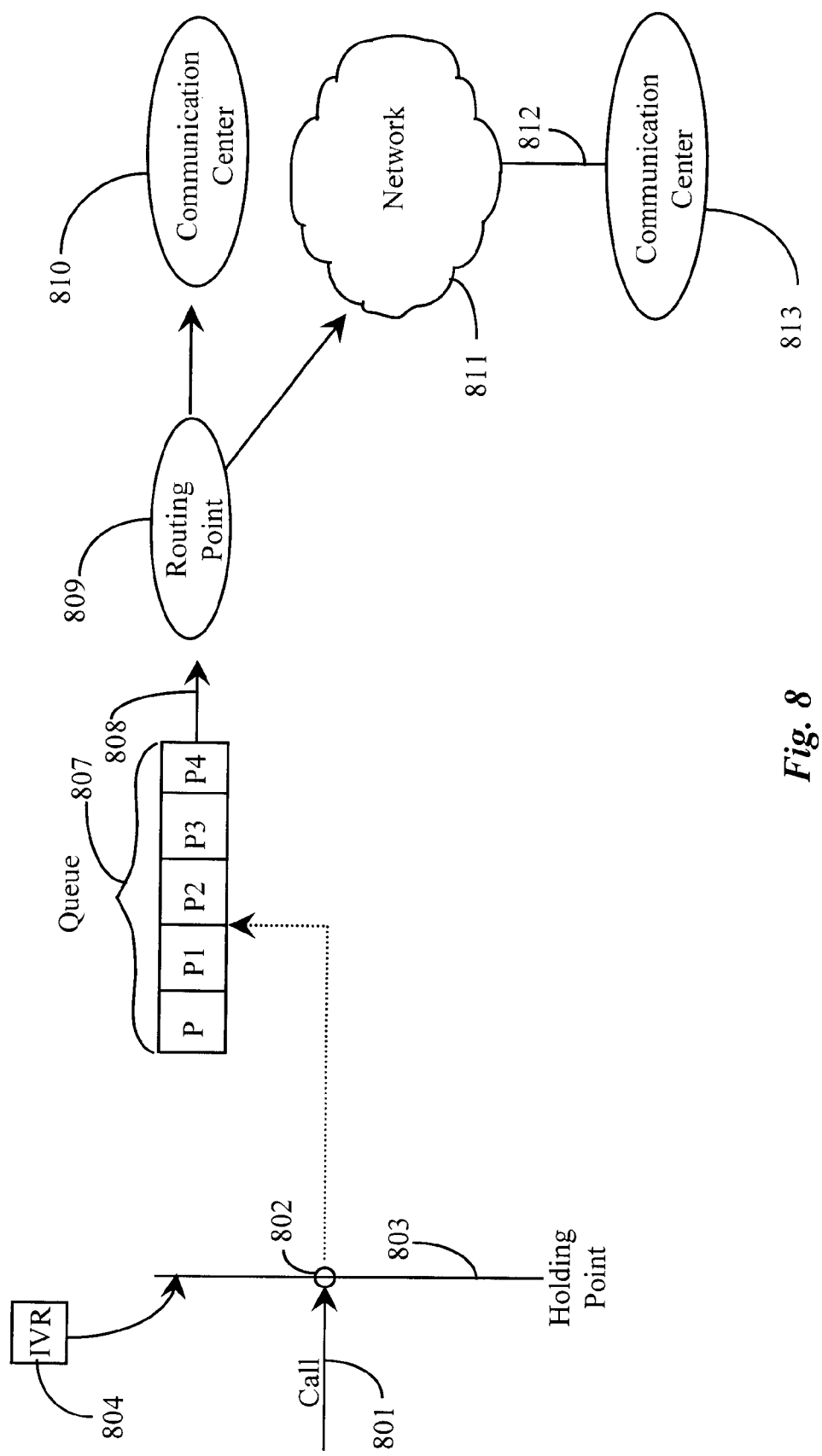
FIG. 8 is a block diagram illustrating events in queue waiting for attention from a communication center, in an embodiment of the present invention.

FIG. 8 is a block diagram illustrating a priority queue system according to an embodiment of the present invention. One with skill in the art may refer to FIG. 1 or 5 of this specification to understand the basic architecture of a communication center of the type practicing the present invention.

Any communication events, which are referred to hereinafter as calls 801 of a group are illustrated as coming into the system of the present invention by a directional arrow (801). Calls 801 are temporarily held at a holding point designated by a timeline labeled Holding Point and given the element number 803. An actual call being held is represented herein as a small circle intersecting line 803 and given element number 802. Holding point 803 may be analogous to any point in time after events are received in, for example, a CTI-enabled switch installed at any point in a communication system before final destination queuing. For example holding point 803 may be initiated at a service control point (SCP) analogous to one illustrated in FIG. 5 above or a switch (ACD, PBX) that is an internal to communication center wherein the call will be routed. If there are more than one communication center involved in a routing decision than holding point 803 will likely be within a communications network at the public level.

Caller 802 holding at point 803 will typically have access to an IVR illustrated herein as a block labeled IVR and given the element number 804. IVR 804 is adapted to elicit information from the caller 802 at holding point 803 for the purpose of giving the caller an opportunity to pre-assign his or her own queue position. Music and advertisements may also be delivered to caller 802 at point 803 as would be the course of normal business. Typically, IVR 804 will be an adjunct peripheral that is connected to a CTI-processor and that may have access to a database and other telephony resources through T-server capabilities as illustrated with respect to the architecture of FIG. 5 above.

In another embodiment IVR accessibility is available to a caller on hold and waiting to be routed after the callers' position in queue is established. In this case, a caller may again initiate IVR interaction for the purpose of bidding for advancement or further advancement in queue. In still another embodiment there are other communication methods and supporting hardware available to clients depending on media type of the call or event queued and whether or not a caller or media author is actually holding or will be holding for instant routing. For example, in the case of e-mail to the communication center from a Web server, an interactive option (Web form) may be linked to the mail message enabling the client to transact something of value to the center in exchange for a better position in queue. In this case, once the author of the e-mail accepts or rejects the offer of the Web form, his or her routing and response time is pre-determined.

For IP telephony communication and other real time voice communication programs, routing is much like COST telephony in the communication center environment. Digital IVR and text interaction can be exchanged between the client and a center. There are many possibilities.

A priority queue illustrated herein as queue 807 is provided and adapted to queue callers according to a generic priority, and perhaps also using a fairness scheme. That is to say that a generic priority assignment may be assigned to each caller automatically without caller participation. Such a generic priority assignment may be based on any number of states known about the caller such as CLID, DNIS, and other conventions. Generic priority assignment may also be based partly on purchase history or other statistical behavior that may already be known about the caller.

Queue 807 represents a final queue before a routing point illustrated herein as an ellipse labeled Routing Point and given the element number 809. Routing point 809 represents any routing point in a network and typically encompasses routing intelligence and routine, including agent availability and the like. Calls positioned in queue 807 advance to routing point 809 as indicated by a directional transfer arrow labeled 808. In this example, P4 represents the highest priority level in queue 807 while P represents the lowest priority level. In this case there are 5 priority levels. One with skill in the art will recognize that there may be more or fewer levels of assigned priority associated with queue 807 than are illustrated in this example without departing from the spirit and scope of the invention.

From routing point 809, calls may be routed directly to a destination center illustrated herein as an ellipse labeled Communication Center and given the element number 810, or calls may be routed back into or through a same or other network illustrated herein as a cloud icon labeled Network and given the element number 811. In the case of routing into and through network 811, another communication center illustrated in this example as an ellipse labeled Communication Center and given the element number 813 may be a likely destination. Center 813 has network access to network 811 through a network access line 812. Whether the invention is practiced at center level or agent level or both depends on architecture and enterprise structure.

Referring now back to queue 807, positions retained therein on behalf of the callers are generically prioritized to begin with. Therefore, a situation in routing is present wherein P–P4 are priority levels automatically assigned to incoming calls. In the true sense of an auction, an auctioneer works a crowed of bidders in real time wherein the bidders compete with each other in bidding for a desired item of the auction. The contribution of value to the estate or entity holding the auction is the bid promise from the bidder.

A goal of the present invention is to enable an auction-type environment of prioritized routing wherein clients may, through promise of contribution or through instant contribution, advance their position in queue in terms of both generic priority level and in some embodiments specialized priority levels such as, perhaps first-routed of multiple top-priority clients. The exact type of contribution accepted for the exact level of priority and queue position within that level will depend on variable factors like the type of enterprise and service offered; the method or vehicles of compensation from the client to the enterprise; and the prioritized structure of the queue system.

In one embodiment of the present invention clients are prioritized according to whether or not they will register with or become members of a service organization. Registering assumes that important information owned by the client will be submitted to the service organization as a valued contribution. If the contribution is made during a contact attempt then the contribution advances the client in queue from a prior priority assignment to an assignment of a higher level. In this same embodiment, if the client is willing to take a certain survey, or agrees to participate in a study, or perhaps agrees to listen to specific advertising during the same contact period then his or her queue position can be advanced even more. Competitiveness with other clients attempting to contact the organization is, of course, structured so that load balancing and even distribution to agents of the center may still be achieved.

It is important to note herein that queue 807 can be a multimedia queue holding several different types of events. For example, queue 807 can be dedicated to a variety of electronic communications including but not limited to instant messages, voice relay, voice chat, chat relay, e-mail, SMS, and so on. In one embodiment queue 807 can be dedicated to COST communication. In a virtual sense queue 807 may organize queue positioning for all incoming communication events whether they are COST or DNT events.

Routing point 809 represents routing software and hardware that would normally be used in the communication center for routing specific types or combinations of types of e-communications like VoIP, chat, voicechat, VON, VoXML, e-mail, IMPP, and SMS type events, not to mention telephony events.

Figure 9:
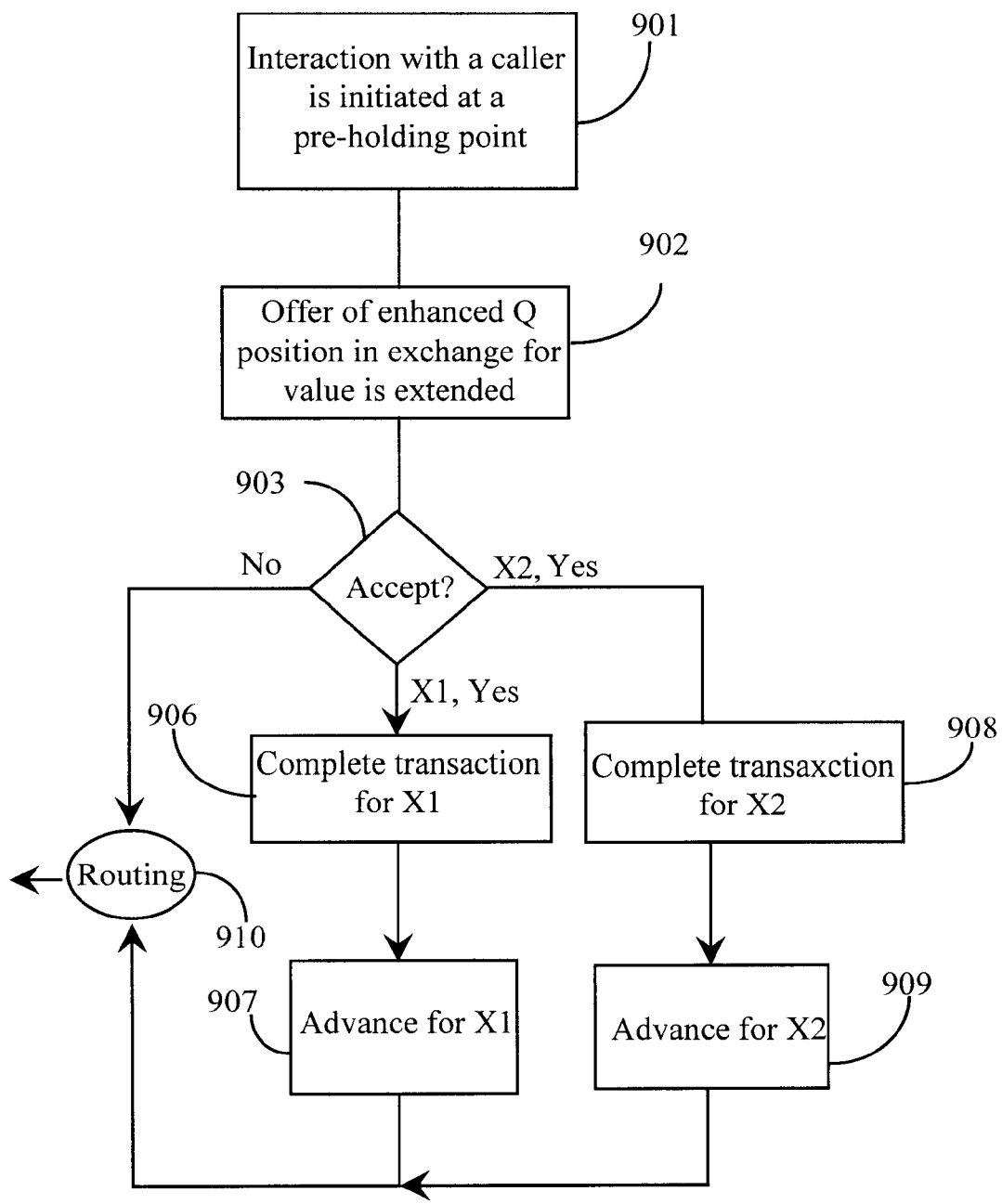
FIG. 9 is a flow diagram of a user interaction that allows the user to prioritize position in the queue according to an embodiment of the present invention.

FIG. 9 is a flow diagram of a user interaction that allows the user to prioritize position in queue according to an embodiment of the present invention. At step 901, interaction with a caller is initiated at a holding point analogous to holding point 803 of FIG. 8. Interaction may be interactive voice response including touchtone capability or in may be some other form of interaction for some other form of media. A holding point may be a service control point within the PSTN network, a Web server within a digital network, the telephone switch within a communication center, a web page in a chat room, or any other position or interaction is possible before routing events.

At step 902, an offer of enhanced queue positioning in exchange for something of value from the client is made to the instant client. There are many possibilities for this type of transaction. In one embodiment, queue positioning may be exchanged for willingness to listen to advertisements. In another embodiment queue positioning may be exchanged for willingness to register or join the service organization. In this example there is more than one queue-position enhancement offered, that of X1 (position 1) and that of X2 (position 2). Therefore, at step 903, a client has 3 options to choose from. It will be apparent to the skilled artisan that there may additionally be other offers and options.

At step 903 if the client says no to the offers for better position, then he or she is queued according to generic priority with no enhancement and will eventually be routed at routing point 910, which is analogous to routing point 809 of FIG. 8. If at step 903, the client accepts the offer for X1 in queue, then at step 906, the conditions of the offer are completed and at step 907 the advancement is made. It is noted herein that in one embodiment completing a transaction may just be acquiring a promise from the client to complete the transaction at a later time after routing. In this particular embodiment, the conditions for advancement are satisfied before advancement occurs. Similarly, if the client accepts the offer for advancement to X2 at step 903, then at step 908 the transaction is completed and at step 909, the client is advanced to X2. This particular embodiment assumes that the conditions for advancement in queue are satisfied while the client is, in effect, in the queue. However, that is not required in order to practice the present invention, as it is desired in most instances not to burden the client with time-consuming activity while he or she is holding. Therefore, steps 906 and 908 may be fully satisfied after queue advancement at steps 907 and 909 and after routing at routing point 910.

In one embodiment of the present invention, communication channels with each client in queue can be established so that clients may actually bid against each other for better queue position in a true sense of auctioneering. For example, in some cases such as a highly profit-driven environment where quick engagement with an agent results in more advantage to the client such as in some stock transaction scenarios or when placing bets, then clients may actually promise cash increments or the like to shave certain amounts of time of a public queue waiting time. A client paying, say a $10.00 commission to a stock broker for a single transaction would be advanced ahead of the client only willing to pay a $5.00 commission and so on.

In an alternate embodiment, the concept of "auction routing" may be reversed such that the "offer of value" or a bid might be from a communication-center host or entity to a client instead of from the client to the host. The offer of value may be given to a client for agreeing to wait longer in a queue instead of being advanced in the queue. In this case scenario "auction routing" is reversed such that the host is bidding to each client. This concept may be practiced to help load balance busy agents without losing clients due to long waiting periods.

In yet other cases, a "Dutch auction" may be used, at which a high starting price is offered, going down, and the first taker has to pay the price when he decides to make the call. Waiting too long has the risk of loosing the opportunity. Typically, the lowering stops at a predetermined, previously known cut-off, at which normally the offer is retracted.

The present invention may be practiced in a communication center that is enhanced for IP telephony as well as COST telephony, and may be modified to work with alternate forms of media such as voice mail and the like. Therefore, the method and apparatus of the present invention should be afforded the broadest scope. The spirit and scope of the present invention is limited only by the claims that follow.

What is claimed is:

1. A routing system for routing communication events comprising:
   at least one data queue for queuing incoming events;
   at least one interaction mechanism for enabling bi-directional communication with authors of events in queue; and
   a processor for processing events in queue according to routing rules;
   characterized in that authors of the communication events are advanced in the data queue in exchange for a value contribution made in response to a solicitation by the at least one interaction mechanism.

2. The system of claim 1 wherein the communication events are telephony events and the interaction mechanism is an IVR.

3. The system of claim 1 wherein the communication events are instant messages and interaction mechanism is a Web form.

4. The system of claim 1 wherein the communication events are e-mails and interaction mechanism is a Web form.

5. The system of claim 1 wherein the communication events are data network telephony events and interaction mechanism is a digital IVR.

6. The system of claim 1 wherein the data queue has at least two levels of priority.

7. The system of claim 1 when a processor is a CTI processor.

8. The system of claim 1 wherein the value contribution is financial.

9. The system of claim 1 wherein the value contribution is attention for a period of time.

10. The system of claim 1 wherein the value contribution is transacted prior to routing.

11. The system of claim 1 wherein the value contribution is transacted after routing.

12. A method for processing communication events in a queue according to priority assigned per event in exchange for a value contribution per event comprising steps of:
   (a) interacting with the author of each event to establish a value contribution promise or not;
   (b) upon receiving a promise of a value contribution, transacting the value contribution on behalf of the author; and
   (c) advancing the queue position of the message of the author in exchange for the value contribution made in response to the interaction of step (a), according to the rules of transaction.

13. The method of claim 12 wherein the communication events are telephony events and in step (a) interaction is through an IVR.

14. The method of claim 12 wherein the communication events are instant messages and in step (a) interaction is through a Web form.

15. The method of claim 12 wherein the communication events are e-mails and in step (a) interaction is through Web form.

16. The method of claim 12 wherein the communication events are data network telephony events and in step (a) interaction is through digital IVR.

17. The method of claim 12 wherein the data queue has at least two levels of priority.

18. The method of claim 12 wherein processing of queued events is performed by a CTI processor.

19. The method of claim 12 wherein in steps (a) and (b) the value contribution is financial.

20. The method of claim 12 wherein in steps (a) and (b) the value contribution is attention for a period of time.

21. The method of claim 12 wherein in steps (a) and (b) the value contribution is the submission of information.

22. A method for processing communication events in a queue according to priority assigned per event in exchange for a value contribution per event comprising steps of:
   (a) interacting with the author of each event to establish a value contribution promise or not;
   (b) upon receiving promise of a value contribution, advancing the queue position of the event of the author in exchange for the value contribution made in response to the interaction of step (a), according to transaction rules associated with the value contribution; and
   (c) after routing to final destination according to enhanced priority transacting the value contribution to the satisfaction of both parties.

23. The method of claim 22 wherein the communication events are telephony events and in step (a) interaction is through an IVR.

24. The method of claim 22 wherein the communication events are instant messages and in step (a) interaction is through a Web form.

25. The method of claim 22 wherein the communication events are e-mails and in step (a) interaction is through Web form.

26. The method of claim 22 wherein the communication events are data network telephony events and in step (a) interaction is through digital IVR.

27. The method of claim 22 wherein the data queue has at least two levels of priority.

28. The method of claim 22 wherein processing of queued events is performed by a CTI processor.

29. The method of claim 22 wherein in steps (a) and (b) the value contribution is financial.

30. The method of claim 22 wherein in steps (a) and (b) the value contribution is attention for a period of time.

31. The method of claim 22 wherein in steps (a) and (b) the value contribution is the submission of information.

* * * * *